Oct. 2, 1934.  A. GIRARD  1,975,638
SEWAGE PURIFICATION
Filed Feb. 10, 1932

Patented Oct. 2, 1934

1,975,638

UNITED STATES PATENT OFFICE 1,975,638

SEWAGE PURIFICATION

Alexandre Girard, Bellevue-Seine, France

Application February 10, 1932, Serial No. 592,083
In Belgium February 12, 1931

1 Claim. (Cl. 210—5)

The invention relates to the devices or apparatus used for purifying sewage liquids and matters on so-called "bacterial beds".

The essential difference between the invention and all devices already known for the same purpose, is that important means are provided in order to intensify the oxidation of the bacterial beds by atmospheric air. There are four different means provided for said purpose, viz.:

1. Intermittent flow of the liquid through the beds, so that each discharge is followed by an air intake which facilitates and intensifies the nitrification process.

2. The trays which carry the bacterial beds are given a slight slope, which makes it possible to effect alternation of liquid flow and air entry, the outlet duct of each particular tray having its bottom flush with the lowest end of the tray, in order that the liquid which has arrived in a given tray may flow out in totality.

3. The special structure of the trays, devised in view of facilitating the access to the beds, and more especially to the drainage layer provided at bottom of each bed, the trays being made of materials which are pervious to air or arranged so as to allow of air passing through.

4. A filter, which may consist of wood chips on the path of the liquid, before said liquid enters the tray, in order to prevent clogging of the bed.

One way of carrying out the invention is shown, as a matter of example, in the accompanying drawing, wherein.

Figure 1:
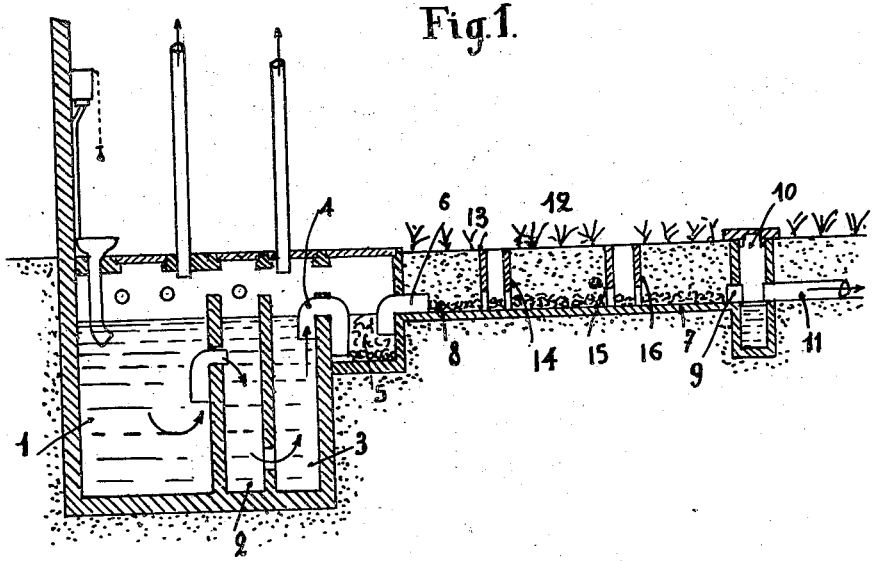
Fig. 1 is a lengthwise section of a septic tank with exposed bacterial bed, the latter being provided with transversal partitions, as hereinafter described.

The septic tank or pit shown in Fig. 1 is of the three-chamber type, having three distinct chambers 1, 2, 3. The liquid follows the path shown by the arrows, after which it is discharged through the siphon 4, flows through a filter 5, which is filled with wood chips, and enters the bacterial bed, which is of the open or "exposed" type, through a pipe 6.

The bacterial bed or tray consists of a concrete trough 7 whose bottom is entirely covered by a layer of gravel or broken stone 8, which is the drainage layer. The bottom of the trough has a slight downward slope towards the right side of the drawing. The discharge duct of the bed is flush with the lowest point of the bottom of the concrete trough, so that the liquid is discharged in totality from the bed into the sampling pit 10, which serves for checking up the efficiency of the purification process, the purified liquid is then discharged to the sewer through the pipe 11.

The stone layer or drainage layer 8, which covers the concrete tray, is in turn covered with a layer of vegetable mould 12, on which plants or vegetables are cultivated. The surface of the tray is divided by a number cross-partitions 13—14, 15—16, which are parallel and arranged by pairs so as to form two trenches or channels. No earth or vegetable mould is put in these trenches. As a consequence the drainage layer 8 is thus exposed inside these, so that the liquid comes into contact with atmospheric air over a sufficient area. These arrangements ensure perfect operation of the bacterial bed.

Figure 2:
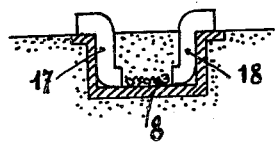
Fig. 2 is a cross-section of a bacterial bed tray provided with air intake ducts.

Fig. 2 is a cross-section of a bacterial bed similar to that shown in Fig. 1. Here again, the bottom of the concrete trough is covered with a stone layer (or drainage layer) 8. Two pipes 17—18 are provided on the side walls of the trough. The lower ends of these pipes open at the level of the said drainage layer 8, whereas, their top ends open in the free air. This arrangement ensures intensive aeration of the drainage layer.

The same principles and essential characteristics may be carried in many various shapes, in order to meet the requirements of each particular case, for instance with respect to location of the purifying plant, character of the materials available, etc. For instance, instead of cultivating the bacterial bed as shown in Fig. 1 (see 12), the beds can be installed below ground level, superimposed at various levels, a cover is then provided above the whole, in order to allow walking or traffic, and ventilation pipes are provided in order that air may gain access to the device.

The individual beds or trays can also be arranged in steps where this is of advantage on account of the shape of the ground.

Having now particularly described and ascertained the nature of my said invention and in what manner the same is to be performed I declare that what I claim is:

An apparatus for the purification of sewage, comprising a septic tank, a series of inclined impervious trays leading therefrom to a common point of discharge, a substantially non-retarding layer of pervious material in said trays, constituting a drainage bed, means for producing an intermittent flow of liquid from said septic tank to and through said drainage bed, and means for supplying air to said bed between the periods of flow, comprising transverse walls spaced apart and forming open spaces between the trays.

ALEXANDRE GIRARD.